United States Patent [19]
Ito et al.

[11] Patent Number: 5,560,996
[45] Date of Patent: Oct. 1, 1996

[54] PRINTING PAPER, DYE-RECEIVING LAYER FORMING COMPOSITION FOR PREPARING IT, INK COMPOSITION SUITABLE FOR IT, AND IMAGE FORMING METHOD USING THEM

[75] Inventors: Kengo Ito, Miyagi; Yoshio Fujiwara, Tochigi, both of Japan

[73] Assignee: Sony Corporation, Tokyo, Japan

[21] Appl. No.: 271,761

[22] Filed: Jul. 7, 1994

[30] Foreign Application Priority Data

Jul. 8, 1993 [JP] Japan ............... 5-194109
Apr. 21, 1994 [JP] Japan ............... 6-107647

[51] Int. Cl.$^6$ .......................... B41M 5/00
[52] U.S. Cl. .......................... 428/500; 428/195; 428/206; 428/209; 428/211; 428/331; 428/520; 428/522; 428/532; 428/534; 428/535; 428/536; 428/704
[58] Field of Search .................. 428/195, 206, 428/331, 209, 211, 500, 520, 522, 532, 534, 535, 536, 704

[56] References Cited

U.S. PATENT DOCUMENTS

| | | | |
|---|---|---|---|
| 4,446,174 | 5/1984 | Maekawa et al. | 427/261 |
| 4,613,525 | 9/1986 | Miyamoto et al. | 427/256 |
| 4,792,487 | 12/1988 | Schubring et al. | 428/342 |

FOREIGN PATENT DOCUMENTS

| | | | |
|---|---|---|---|
| 0506034A1 | 6/1992 | European Pat. Off. | 503/218 |
| 0580120A1 | 3/1993 | European Pat. Off. | 503/218 |
| 55-150395 | 11/1980 | Japan | 428/195 |

OTHER PUBLICATIONS

Derwent Accession No. 93–61 427 & JP–A–05 8543.
Derwent Accession No. 90–17 & JP–A–01 295 883.
Derwent Accession No. 94–53 791 & JP–A–06 8660.

*Primary Examiner*—Bruce H. Hess
*Attorney, Agent, or Firm*—Hill, Steadman & Simpson

[57] ABSTRACT

Color images with high fixation comparable to that of silver salt photographic images are formed on printing papers, using aqueous ink compositions by ink jet recording. Color images thus formed have high saturation and high resolution. An intercalated compound capable of fixing water-soluble dyes to a printing paper due to the intercalation based on ion-exchanging between them is incorporated into the dye-receiving layer 2 of the paper, on which color images are formed by ink jet recording using an aqueous ink composition containing a water-soluble dye. The content of the intercalated compound in the layer 2 is from 10 to 90% by weight. As the intercalated compound, montmorillonoids are preferred when water-soluble cationic dyes are used while hydrotalcite-group minerals are preferred when water-soluble anionic dyes are used. FIG. 1 is selected.

11 Claims, 5 Drawing Sheets

PRINTING PAPER, DYE-RECEIVING LAYER FORMING COMPOSITION FOR PREPARING IT, INK COMPOSITION SUITABLE FOR IT, AND IMAGE FORMING METHOD USING THEM

BACKGROUND OF THE INVENTION

The present invention relates to a printing paper capable of forming a color image with excellent fixability, using an aqueous ink composition containing a water-soluble dye such as a water-soluble cationic dye and, in particular, to a printing paper suitable for ink jet recording. It also relates to a composition for forming a dye-receiving layer for such a printing paper, an ink composition suitable for the same, and a method for forming an image using them.

As one means for fixing an image information prepared by the use of a personal computer, etc. on a printing paper in the same manner as in silver salt photography, a method of forming a color image on a printing paper according to an ink jet recording system using an aqueous ink composition is considered hopeful.

In such an ink jet recording system, a liquid, aqueous ink composition containing a water-soluble dye, water, a polyalcohol, etc. is letted out and adhered onto a printing paper having a dye-receiving layer at the dye-receiving layer through nozzles, using a driving power such as electric field, heat and pressure to thereby form an image thereon.

The water-soluble dye to be employed in the aqueous ink composition for such an ink jet recording system is essentially a water-soluble direct dye or acidic dye (hereinafter referred to as "anionic dye") having a sufficient fixability to cellulose constituting paper which is essentially used as a recording medium and capable of yielding a black color by itself. Accordingly, in general, a basic dye (hereinafter referred to as "cationic dye") is not used as the dye in an aqueous ink composition at present because of its drawbacks that its fixability to cellulose is not sufficient as compared with anionic dyes and that it cannot form a black color if not mixed with others.

On the other hand, the ink-receiving surface of the printing paper to be used in the ink jet recording system using such an aqueous ink composition has a dye-receiving layer composed of various additives dispersed in a water-soluble high polymer having a high affinity for dyes so as to prevent the aqueous ink composition applied thereto from bleeding.

Conventional water-soluble anionic dyes used in the ink jet recording system are, after having been transferred to the dye-receiving layer, captured in the dye-receiving layer due to the interactions such as van der Waals force and hydrogen bonding between them and the constituent components in the dye-receiving layer, according to the theory of dyeing. Therefore, after formation of images, when other substances such as solvents or resins having a higher affinity for these dyes are brought into contact with the formed images or when some heat energy enough to cancel these interactions is applied thereto, then the dyes will dissolve out or transfer from the dye-receiving layer to such other substances whereby the thus-formed images will be blurred without having complete fixation to the layer unlike so-called silver salt photographs. Being different from silver salt photographs, therefore, therefore, the images formed by the ink jet recording system are problematic in this respect.

As some means for solving the problem, it has been proposed to chemically fix such dyes to a dye-receiving layer by forming chemical bonds between the dyes and the compounds constituting the dye-receiving layer (see JP-B 62-798, 63-11158, U.S. Pat. No. 4,694,302, JP-A 1-225585, etc.—the terms "JP-A" and "JP-B" as referred to herein mean an "examined Japanese patent publication" and an "unexamined Japanese patent application", respectively). Concretely, it has been proposed to use reactive dyes as the dye component in the ink composition so as to form covalent bonds between the reactive groups in the reactive dyes and the active groups in the dye-receiving layer or to form ionic bonds between anionic dyes and cationic organic polymers or cationic inorganic low-molecular compounds in the dye-receiving layer.

However, the conventional means of chemically fixing dyes in the dye-receiving layer by forming chemical bonds therebetween still were problematic in that the degrees of reactivity of the dyes and the dye-receiving layer were too high to attain sufficient preservation of inks and printing papers themselves and also images formed and to realize the fixation of the formed images comparable to that of silver salt photographic images and that, on the contrary, their reactivity was not sufficient so that the reaction between them could not be finished in a short period of time and therefore a long period of time was needed for forming stable images. In addition, the conventional means had other problems that they often needed some auxiliary devices for heating, etc. so as to fix the images, the preparation of dyes for the means was often difficult and the usable color hue range was limited. As further problems in these conventional means, the solvent resistance and the light fastness of the color images formed on printing papers by these means were still unsatisfactory so that the fixation of the images thereon was insufficient even though waterproofness was imparted to the images.

Therefore, in order to make the images formed by the conventional ink jet recording system usable even in the field that needs high image durability, for example, including photographs for identity cards and prints for outdoor exhibition, the improvement in the fixation of the color images formed is strongly desired along with the improvement in their saturation and resolution so as to be able to obtain high-quality color images.

Heretofore, particular ink jet recording papers having a dye-receiving layer formed thereon have been needed as printing papers for ink jet recording. However, it is strongly desired that any unlimited base materials having no dye-receiving layer thereon, such as household or officehold high-quality papers, art papers and OHP sheets, may be applied to ink jet recording.

SUMMARY OF THE INVENTION

The present invention is to overcome the above-mentioned problems in the prior art, and its object is to form color images having satisfactory fixation comparable to the fixation of silver salt photographic images, using aqueous ink composition, preferably on printing papers by ink jet recording with high saturation and high resolution. Specifically, one object of the present invention is to form color images having satisfactory fixation comparable to the fixation of silver salt photographic images, on printing papers by ink jet recording with high saturation and high resolution, even though using aqueous ink compositions containing water-soluble cationic dyes that have not been used in the prior art or water-soluble anionic dyes that have heretofore been used but could not attain sufficient fixation.

Another object of the present invention is to provide novel means by which ink jet recording is possible on any unlimited base materials having no dye-receiving layer thereon.

We, the present inventors, having noticed that water-soluble cationic dyes or water-soluble anionic dyes have excellent water-absorbability or water-swellability and may be firmly fixed to the hydrophilic interlayer in intercalated compounds having cation-exchangeability or anion-exchangeability due to intercalation based on ion-exchanging between them, have found that when such an intercalated compound is incorporated into the dye-receiving layer on a printing paper and when an aqueous ink composition containing water-soluble cationic dyes or water-soluble anionic dyes is imagewise applied to the dye-receiving layer, then a color image with excellent fixation and high resolution may be formed thereon and that when a colorless, highly-transparent intercalated compound is incorporated into the dye-receiving layer along with a binder resin, then the saturation of the color image to be formed may be improved.

In addition, we have found that when ink jet recording applicable to any unlimited base materials having no dye-receiving layer is desired, a composition for forming a dye-receiving layer comprising an intercalated compound, a binder resin and a solvent shall be coated over a base material just before ink jet recording, preferably by spraying or jetting out the composition over the surface of the base material through the orifices of nozzles, such as spraying nozzles or ink-jetting nozzles. For this purpose, we have found that, in order to stably spray or jet out the composition for forming a dye-receiving layer through the nozzles, the composition preferably contains a particular solvent and that the mean particle size of the particles of the intercalated compound to be dispersed in the solvent is desired to have a specific value or less. On the basis of these findings, we have completed the present invention.

Specifically, the present invention provides a printing paper containing an intercalated compound that may fix water-soluble dyes to the paper due to the intercalation based on ion-exchanging between them.

In addition, the present invention also provides a composition for forming a dye-receiving layer on such a printing paper, which contains an intercalated compound capable of fixing water-soluble dyes to the layer due to the intercalation based on ion-exchanging between the compound and dyes, a binder resin and a solvent.

Further, the present invention provides an ink composition applicable to the above-mentioned printing paper and containing at least water and water-soluble dye(s), in which said water-soluble dye(s) is/are particular water-soluble cationic dye(s).

Still further, the present invention provides a method for forming an image on the above-mentioned printing paper, especially that having a base support and a dye-receiving layer, by an ink jet recording system using an ink composition containing water-soluble dye(s), in which the above-mentioned composition for forming a dye-receiving layer is sprayed or jetted out over the base support through nozzles to form a dye-receiving layer thereon and thereafter an image is formed on the dye-receiving layer.

BRIEF DESCRIPTION OF THE DRAWINGS

In FIGS. 1, 2 and 3; 1 is a base support, 2 is a dye-receiving layer, and 3 is an adhesive layer.

FIG. 7(a) is an explanatory view showing the condition of intercalated compounds; FIG. 7(b) is an explanatory view showing the condition of intercalated compounds where a part of exchangeable cations have been substituted by organic cations; and FIG. 7(c) is an explanatory view showing the condition of intercalated compounds where water-soluble cationic dye molecules have been held between the compounds.

FIG. 8(a) is an explanatory view showing the condition of intercalated compounds; FIG. 8(b) is an explanatory view showing the condition of intercalated compounds where a part of exchangeable anions have been substituted by organic anions; and FIG. 8(c) is an explanatory view showing the condition of intercalated compounds where water-soluble anionic dye molecules have been held between the compounds.

DETAILED DESCRIPTION OF THE INVENTION

The printing paper of the present invention will be described in detail, with reference to the drawings.

Figure 1:
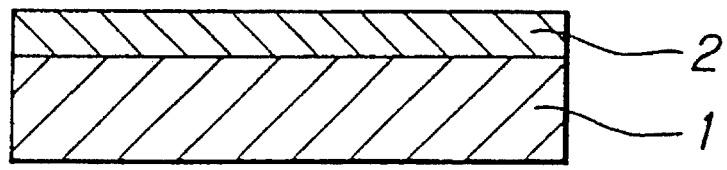
FIG. 1 is a cross-sectional view showing one embodiment of the printing paper of the present invention.
Figure 2:
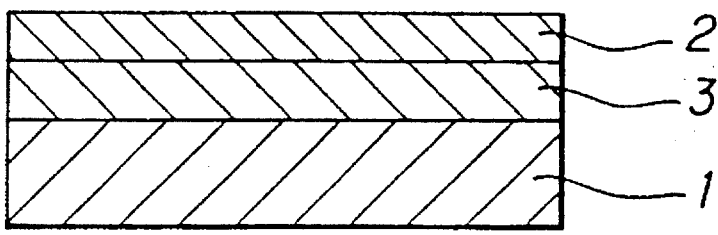
FIG. 2 is a cross-sectional view showing another embodiment of the printing paper of the present invention.
Figure 3:
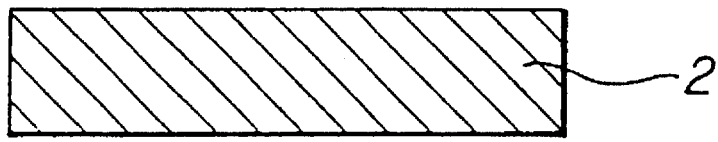
FIG. 3 is a cross-sectional view showing still another embodiment of the printing paper of the present invention.

FIGS. 1 to 3 are cross-sectional views showing preferred embodiments of the printing paper of the present invention. The embodiment of FIG. 1 is composed of a base support 1 and a dye-receiving layer 2 formed thereon; and that of FIG. 2 has an adhesive layer between the dye-receiving layer 2 and the base support 1. In the embodiment of FIG. 3, the dye-receiving layer itself acts also as a base support.

In the present invention, the dye-receiving layer 2 contains an intercalated compound capable of fixing and holding water-soluble dye molecules by intercalation based on ion-exchanging between them. For example, in the embodiments of FIG. 1 and FIG. 2, the structure of the dye-receiving layer 2 may be such that particles of an intercalated compound have been uniformly dispersed in a binder resin. In the embodiment of FIG. 3, the dye-receiving layer 2 may be in the form of paper to be made from a paper stock mixture containing a beaten pulp, an intercalated compound, a sizing agent, etc. to have such a structure that the particles of the intercalated compound have been held between pulp fibers of the paper. In place of pulp, also usable are synthetic fibers in this embodiment.

As the intercalated compound to be in the dye-receiving layer 2, preferably exemplified are layered inorganic polymers having a layered structure and having exchangeable ions capable of being ion-exchangeable for water-soluble dye molecules in the interlayer between the hydrophilic layers of the compound. Such exchangeable ions of layered inorganic polymers are exchangeable cations such as sodium ion-for water-soluble cationic dyes, while they and are exchangeable anions such as carboxyl anion for water-soluble anionic dyes.

As layered inorganic polymers having exchangeable cations (hereinafter referred to as "cation-exchangeable intercalated compounds"), typically mentioned are natural or synthetic layered silicates and their sintered products. Of these, typically and preferably used are montmorillonoids of the following formula (1) having a 3-octagonal smectite structure. These are a kind of clay minerals.

$$(X,Y)_{2-3}Z_4O_{10}(OH)_2 \cdot mH_2O \cdot (W_{1/3}) \tag{1}$$

wherein X represents Al, Fe(III), Mn(III) or Co(III);

Y represents Mg, Fe(II), Ni, Zn or Li;

Z represents Si or Al;

W represents K, Na or Ca;

$H_2O$ is an intercalated water; and m represents an integer.

Specifically exemplified are natural or synthetic substances such as montmorillonite, magnesian montmorillonite, iron montmorillonite, iron magnesian montmorillonite, beidellite, aluminian beidellite, nontronite, aluminian nontronite, saponite, aluminian saponite, hectorite and sauconite, depending on the combination of X and Y and the number of their substitutions. In addition, derivatives obtainable from those of formula (1) by substituting the OH group(s) therein by fluorine(s) may also be usable in the present invention.

In the present invention, mica-group minerals such as sodium silicic mica, sodium taeniolite and lithium taeniolite are also usable as cation-exchangeable intercalated compounds, in addition to montmorillonoids of formula (1).

There are known acidic salts such as zirconium phosphate, as well as layered titanium oxide hydrate, etc., as inorganic polymers or cation-exchangeable intercalated compounds having a layered structure and having exchangeable cations, like synthetic clay minerals. These may be incorporated into dye-receiving layers that are not needed to be transparent, glossy and white, as having optical light-shieldability or have intrinsic colors.

In addition to the above-mentioned cation-exchangeable intercalated compounds, mentioned are amorphous synthetic silica, etc. as synthetic silicates having high affinity for cationic dyes. However, these are inferior to montmorillonoids with respect to their dye-fixability or their ion-exchangeability in media having a high dielectric constant such as water. Therefore, these may be employed when high ion-exchangeability is not needed.

When a fine powder having a pure white color, such as a powdery synthetic silicate containing no impurity, is used as the cation-exchangeable intercalated compound mentioned above, it is possible to form a dye-receiving layer capable of realizing a high saturation comparable to the saturation of silver salt photographs since crystals of the fine powder themselves are optically transparent.

As exchangeable cations to be present between the cation-exchangeable intercalated compound molecules to be used in the present invention, mentioned are inorganic cations that may easily solvate with media having a high dielectric constant, such as water and alcohols, for example, alkali metal ions such as $Li^+$, $Na^+$ and $K^+$; alkaline earth metal ions such as $Mg^{2+}$; $H^+$ (in this case, so-called clay acids are refereed to), etc. Of alkaline earth metal ions, $Ca^{2+}$ and $Ba^{2+}$ often give hardly-solvatable interlayers, as compared with the other inorganic ions mentioned above.

In order to improve the dispersibility of the intercalated compounds in binder resins which will be mentioned hereinafter and to improve the swellability thereof in non-aqueous solvents such as alcohols, a part of the exchangeable inorganic-cations in the cation-exchangeable intercalated compounds may be substituted by organic cations capable of realizing an effect of broadening the interlayer distance between intercalated compound molecules (pillar effect) or an effect of partially hydrophobicating the interlayer between them. As such organic cations, preferably usable are quaternary ammonium ions and phosphonium ions, such as alkylphosphonium ions and arylphosphonium ions. In quaternary ammonium ions to be used in this case, it is preferred that three of their four alkyl groups each have 4 or more, preferably 8 or more carbon atoms. If the number of long-chain alkyl groups is small in them, their pillar effect is not sufficient so that it becomes difficult to ensure the interlayer distance for the fixing sites (=exchangeable inorganic cations). For instance, when n-octyltrimethylammonium ions are employed, the interlayer distance cannot be increased to more than about 4 angstroms even though they occupy almost all the fixing sites, and, in addition, they give too much hydrophobicated interlayers and are therefore unfavorable for the present invention.

As layered inorganic polymers having exchangeable anions (hereinafter referred to "anion-exchangeable layered compounds") to be used in the present invention, preferably exemplified are layered hydrotalcite-group minerals composed of $AlO_6$ octagonal sheets. These are a kind of 0:1 type clay minerals. As one typical example of such hydrotalcite-group minerals, mentioned is natural hydrotalcite of a formula (2):

$$Mg_6Al_2(OH)_{16} \cdot CO_3 \cdot 4H_2O \tag{2}$$

Synthetic hydrotalcites are available as commercial products, though having compositions somewhat different from that of the natural hydrotalcite of formula (2). A fine powder of such synthetic hydrotalcites does not contain impurities and has a pure white color, and the crystals themselves of the powder is optically transparent. Therefore, when the fine powder is used, it is possible to form a dye-receiving layer capable of realizing a high saturation comparable to that of silver salt photographs.

There are known oxide hydrates and hydroxylated phosphates such as those of titanium, zirconium, lanthanum or bismuth, as anion-exchangeable intercalated compounds, in addition to the above-mentioned hydrotalcite-group minerals. These may be incorporated into dye-receiving layers that are not needed to be transparent, glossy and white, as having optical light-shieldability or have intrinsic colors.

As exchangeable anions to be present between the anion-exchangeable intercalated compound molecules to be used in the present invention, mentioned are inorganic anions that may easily solvate with media having a high dielectric constant, such as water and alcohols, for example, $NO_3^-$, $SO_4^{2-}$, $ClO_4^-$, $Fe(CN)_6^{4-}$, heteropolyphosphato ions, hydrophilic organic anions such as lower carboxylato ions, etc. Higher carboxylato ions often give hardly-solvatable interlayers, as compared with the above-mentioned anions.

In order to improve the dispersibility of the intercalated compounds in binder resins which will be mentioned hereinafter and to improve the swellability thereof in non-aqueous solvents such as alcohols, a part of the exchangeable anions in the anion-exchangeable intercalated compounds may be substituted by organic anions capable of realizing an effect of broadening the interlayer distance between intercalated compound molecules (pillar effect) or an effect of partially hydrophobicating the interlayer between them. As such organic anions, for example, mentioned are carboxylato anions, sulfonato anions, ester anions, phosphate ester anions, etc.

In general, such anions have alkyl group(s) or alkenyl group(s). If the number of carbon atoms in such groups is small, the pillar effect of the compounds is not sufficient so that it becomes difficult to ensure the interlayer distance for the fixing sites (=exchangeable inorganic anions). If, however, it is too large, the substitution by the anions is difficult. For these reasons, the number of carbon atoms in such groups is preferably from 5 to 20.

In the printing paper of the present invention, the above-mentioned intercalated compound (cation-exchangeable intercalated compound or anion-exchangeable intercalated compound) is dispersed and held in a binder resin. As the binder resin, usable are ordinary thermoplastic resins. Preferred are hydrophilic resins in which intercalated compounds are easily dispersible and into which solvents in aqueous ink compositions, such as water and alcohols, may penetrate. As such binder resins, preferably exemplified are polyvinyl butyral resins, hydroxypropyl cellulose resins, vinyl pyrrolidone-vinyl acetate copolymer resins, polyvinyl alcohol resins, polyvinyl acetal resins, etc. It is preferred that these binder resins do not substantially have substituents that retard the dye-fixability of intercalated compounds, for example groups, such as ammonium groups, that may be more easily ion-exchanged and held in the interlayer of intercalated compounds relatively than water-soluble dyes and groups that will promote the aggregation of intercalated compounds.

Where such hydrophilic resins or water-soluble resins are used as the binder resin, it is preferred that they are crosslinked with urethane crosslinking agents, etc., so as to ensure the waterproofness of the film after formation of images thereon. Therefore, the binder resins for use in the present invention preferably have substituents capable of participating in the crosslinking reaction, such as OH group and carboxyl group, in such a degree that the substituents do not retard the dye-fixability of intercalated compounds.

Regarding the content of the intercalated compound to be in the dye-receiving layer 2, if it is too small, the dye-fixing effect of the layer will be insufficient. If, however, it is too large, the content of the binder resin in the layer will be relatively small so that the softness of the dye-receiving layer 2 will be lowered. For these reasons, the content is preferably from 10 to 90% by weight, more preferably from 40 to 80% by weight, of the dye-receiving layer 2 (calculated in terms of the solid content in the layer).

If the content of the binder resin in the dye-receiving layer 2 is too small, the dye-receiving layer 2 will be hard so that its filming property will be worsened. If, on the other hand, it is too large, the content of the intercalated compound in the layer will be relatively small to lower the dye-fixability of the layer. For these reasons, the content is preferably from 2 to 50% by weight, more preferably from 5 to 20% by weight, of the dye-receiving layer 2 (calculated in terms of the solid content in the layer).

A plasticizer for controlling the glass transition point Tg of binder polymers may be added to the dye-receiving layer 2, provided that it does not retard the dye-fixability of the intercalated compound in the layer. In addition, various additives, for example, a water-repellent for controlling water-repellency, an ultraviolet absorbent for improving light fastness, a brightening agent for improving image quality, etc. may be added to the layer 2.

The base support 1 to be used in the embodiments of FIG. 1 and FIG. 2 of the present invention may be freely chosen from among paper, synthetic papers, plastic papers, metal sheets, metal foils, aluminium-coated plastic films, etc. When used for OHP or the like, the base support 1 must be light-permeable.

For the adhesive layer 3 to be in the embodiment of FIG. 2, usable are any adhesives that have heretofore been employed in the field of videos, printing papers, etc. For instance, polyurethane adhesives are used.

In the printing paper of the embodiment of FIG. 3, intercalated compounds are held between fibers of pulp, etc. that constitute paper, as so mentioned hereinabove. In this case, the content of the intercalated compound in the paper is preferably from 10 to 70% by weight, more preferably from 20 to 50% by weight, relative to the solid content in the paper, in consideration of the dye-fixability of the compound and the quality of the paper.

The printing paper of the present invention may be prepared by known methods.

For example, the printing paper of the embodiment of FIG. 1 is prepared as follows: An intercalated and a binder resin are dispersed in a medium having a high dielectric constant, and the resulting dispersion is coated over the base support 1. by known coating means, for example, by doctor blading, and then dried to form the dye-receiving layer 2. For instance, a composition for forming a dye-receiving layer is prepared, and the composition is coated over the base support 1 by known coating means and dried to form the dye-receiving layer 2. Next, a release sheet such as a lubricant-treated polyethylene terephthalate film is superposed over the dye-receiving layer 2 and attached thereto under heat and pressure whereby the dye-receiving layer 2 is firmly adhered to the base support 1. Then, the polyethylene terephthalate film is peeled off from the layer 2 to finally obtain the printing paper of FIG. 1. Alternatively, the composition for forming a dye-receiving layer may be sprayed or jetted out over the base support 1 through spraying nozzles or ink-jetting nozzles and then dried to form the dye-receiving layer 2 thereon to obtain the printing paper.

The printing paper of the embodiment of FIG. 2 is prepared as follows: First, a dispersion obtained by dispersing an intercalated compound and a binder resin optionally along with other additives such as a crosslinking agent in a medium having a high dielectric constant is applied to a lubricant-treated polyethylene film by known coating means, for example, by doctor blading, and then dried to form the dye-receiving layer 2 thereon. Apart from this, an adhesive composition is coated on a separate base sheet to form an adhesive layer thereon. The two were attached to each other in such a way that the adhesive layer faces the dye-receiving layer, and heated under pressure to prepare the printing paper of FIG. 2 where the dye-receiving layer 2 has been laminated on the base support 1 via the adhesive layer 3. For instance, a composition for forming a dye-receiving layer is applied to a base support such as a lubricant-treated polyethylene film by known coating means, for example, by doctor blading, and then dried to form a dye-receiving layer transfer sheet (not shown) having a dye-receiving layer thereon. Apart from this, an adhesive composition is coated on a separate base support to form an adhesive layer thereon. The two were attached to each other in such a way that the adhesive layer of the latter faces the dye-receiving layer of the former and heated under pressure to prepare the printing paper of FIG. 2 where the dye-receiving layer 2 has been laminated on the base support 1 via the adhesive layer 3.

The printing paper of the embodiment of FIG. 3 is prepared as follows: A beaten pulp and an intercalated compound are suspended in water optionally along with additives such as a sizing agent, and the resulting suspension is sheeted and dewatered by paper-making to obtain the printing paper of FIG. 3.

The composition for forming a dye-receiving layer of the present invention, which is used in preparing the printing paper of FIG. 1 or FIG. 2, will be mentioned below.

The composition for forming a dye-receiving layer of the present invention contains an intercalated compound capable of fixing and holding water-soluble dyes due to intercalation based on ion-exchanging between them, a binder resin and a solvent, and optionally additives such as a crosslinking agent. Since the composition for forming a dye-receiving layer contains an intercalated compound capable of firmly fixing water-soluble dyes therewith, it is preferably used for forming a dye-receiving layer on a printing paper for ink jet recording which uses an aqueous ink composition. The intercalated compounds and the binder resins to be used in preparing the composition for forming a dye-receiving layer may be the same as those to be used in preparing the printing paper of the present invention.

Specifically, as the intercalated compounds to be in the composition for forming a dye-forming layer of the present invention, usable are layered inorganic polymers having exchangeable cations or exchangeable anions. As layered inorganic polymers having exchangeable cations, preferred are montmorillonoids such as typically those of the above-mentioned formula (1). As layered inorganic polymers having exchangeable anions, preferred are hydrotalcite-group minerals such as typically the compound of the above-mentioned formula (2).

As the binder resins to be in the composition for forming a dye-forming layer of the present invention, preferably used are hydrophilic resins such as typically polyvinyl butyral resins, hydroxypropyl cellulose resins, vinyl pyrrolidone-vinyl acetate copolymer resins, polyvinyl alcohol resins, polyvinyl acetal resins, etc.

The size of the particles of the intercalated compound to be in the composition for forming a dye-receiving layer is not specifically defined, provided that they may be stably dispersed in the composition. When the composition is sprayed or jetted out through nozzles to form the intended dye-receiving layer, for example, in the manner mentioned above, it is preferred that the particles have a mean particle size of 1 μm or less, preferably from 0.01 to 0.5 μm, in order to prevent the nozzles from clogging and to ensure the high dispersion stability of the composition.

As the solvent to be in the composition for forming a dye-receiving layer, preferred are solvents having a high dielectric constant so as to ensure the dispersion of the composition. As such solvents, for example, mentioned are lower alcohols such as isopropanol and ethanol.

The proportions of the constituent components in the composition for forming a dye-receiving layer are preferably such that the content of the intercalated compound is from 10 to 80% by weight, that of the binder resin is 50% by weight or less, and that of the solvent is from 20 to 60% by weight, in consideration of the dye-fixing property and the filming property of the composition.

Ink compositions suitable to the printing paper of the present invention mentioned above, which are suitable for ink jet recording, will be mentioned hereunder.

The ink composition of the present invention comprises at least water and a water-soluble dye that may be fixed and held by the intercalated compound in the dye-fixing layer due to intercalation based on ion-exchanging between them. Precisely, the ink composition contains at least water and a water-soluble dye, and the water-soluble dye is fixed and held by the intercalated compound in the dye-receiving layer formed on the printing paper of the present invention due to intercalation based on ion-exchanging between the compound and the dye. Accordingly, the water-soluble dyes to be used in the present invention are preferably those that may easily penetrate into the interlayers in the intercalated compounds. As such dyes, for example, preferably used are water-soluble cationic dyes having an anion-countering property and having a partition coefficient in a water/chloroform (1/1, by weight) system of 0.1 or more.

Water-soluble dyes usable in the present invention include water-soluble cationic dyes (water-soluble basic dyes) and water-soluble anionic dyes (water-soluble direct dyes and water-soluble acidic dyes).

As water-soluble cationic dyes, usable in the present invention are azo dyes, triphenylmethane dyes, azine dyes, oxazine dyes, thiazine dyes and the like having amine salts residues or quaternary ammonium groups. As specific examples of these, mentioned are C.I. Basic Yellows 1, 2, 11, 13, 14, 19, 21, 25, 28, 32, 33, 34, 35 and 36, for yellow dyes; C.I. Basic Reds 1, 2, 9, 12, 13, 14, 15, 17, 18, 22, 23, 24, 27, 29, 32, 38, 39 and 40, and C.I. Basic Violets 7, 10, 15, 21, 25, 26, 27 and 28, for magenta dyes; C.I. Basic Blues 1, 3, 5, 7, 9, 19, 21, 22, 24, 25, 26, 28, 29, 40, 41, 44, 45, 47, 54, 58, 59, 60, 64, 65, 66, 67, 68 and 75, for cyan dyes; and C.I. Basic Blacks 2 and 8, for black dyes. Especially preferred are C.I. Basic Yellows 21, 36, 67 and 73, and water-soluble cationic dyes of the following formulae (3), (4), (5), (6), (7), (8), (9) and (10):

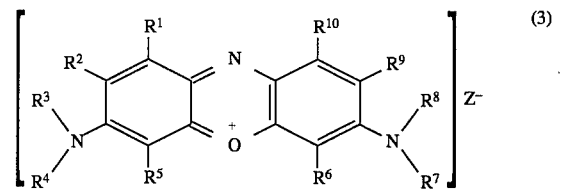

(3)

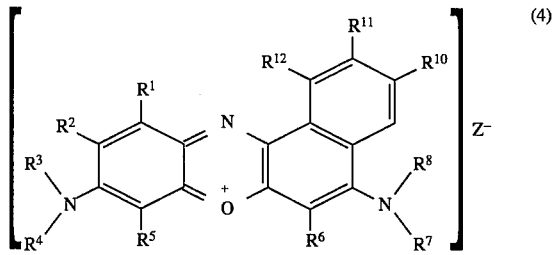

(4)

wherein $R^1$, $R^2$, $R^3$, $R^4$, $R^5$, $R^6$, $R^7$, $R^8$, $R^9$, $R^{10}$, $R^{11}$ and $R^{12}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group or an acyl group, which may optionally be substituted;

$R^1$ and $R^2$; $R^3$ and $R^4$, $R^7$ and $R^8$; $R^9$ and $R^{10}$; $R^{10}$ and $R^{11}$; and $R^{11}$ and $R^{12}$ may be bonded to each other to form a ring; and Z⁻ represents a counter ion.

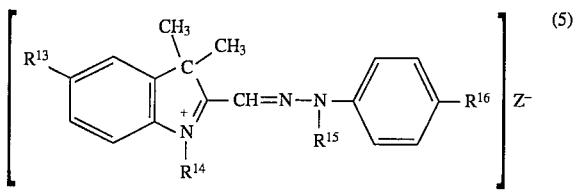

wherein $R^{13}$, $R^{14}$, $R^{15}$ and $R^{16}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group or an acyl group, which may optionally be substituted; and Z⁻ represents a counter ion.

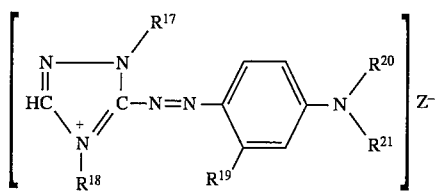

wherein $R^{17}$, $R^{18}$, $R^{19}$, $R^{20}$ and $R^{21}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group or an acyl group, which may optionally be substituted;

$R^{20}$ and $R^{22}$ may be bonded to each other; and

Z⁻ represents a counter ion.

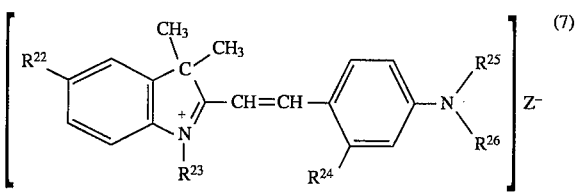

wherein $R^{22}$, $R^{23}$, $R^{24}$, $R^{25}$ and $R^{26}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group or an acyl group, which may optionally be substituted;

$R^{25}$ and $R^{26}$ may be bonded to each other; and

Z⁻ represents a counter ion.

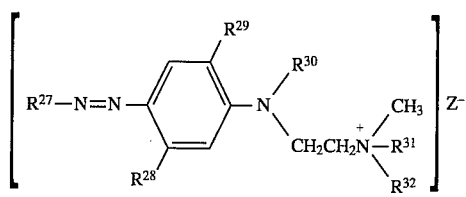

wherein $R^{27}$ represents a substituted or unsubstituted aryl group, or a substituted or unsubstituted heterocyclic group;

$R^{28}$ and $R^{29}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group, an acyl group or an acylamino group, which may optionally be substituted;

$R^{30}$ represents a substituted or unsubstituted alkyl group;

$R^{31}$ and $R^{32}$ independently represent a hydrogen atom, a substituted or unsubstituted alkyl group, or a substituted or unsubstituted aralkyl group, or $R^{31}$ and $R^{32}$ may be bonded to each other; and Z⁻ represents a counter ion.

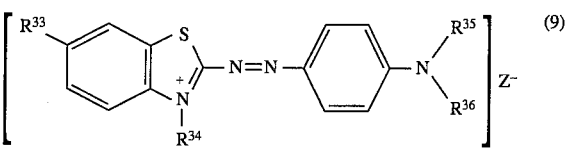

wherein $R^{33}$, $R^{34}$, $R^{35}$ and $R^{36}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group or an acyl group, which may optionally be substituted;

$R^{35}$ and $R^{36}$ may be bonded to each other; and

Z⁻ represents a counter ion.

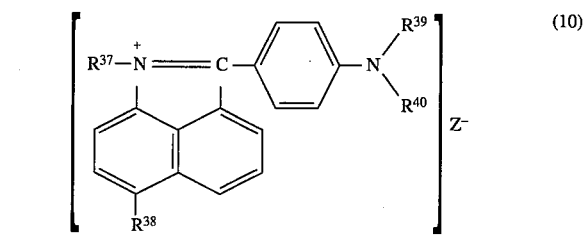

wherein $R^{37}$, $R^{38}$, $R^{39}$ and $R^{40}$ independently represent a hydrogen atom, a halogen atom, a cyano group, an alkyl group, a cycloalkyl group, an alkoxy group, an aryl group, an aryloxy group, an aralkyl group, an aralkoxy group, an alkenyl group, an alkenoxy group, an alkoxycarbonyl group, an acyloxy group or an acyl group, which may optionally be substituted;

$R^{39}$ and $R^{40}$ may be bonded to each other; and

Z⁻ represents a counter ion.

These water-soluble cationic dyes generally have an inorganic anion as the counter ion, and many of them exist as salts of strong acids. Therefore, since their aqueous solutions are generally acidic, it is desired to neutralize them with basic salts in order to prevent metal parts that are kept in contact with ink compositions containing such water-soluble cationic dyes from being corroded by them. For example, it is preferred to treat the counter ions of inorganic anions with sodium salts, etc. of organic anions such as carboxylato ions to thereby substitute the organic anions for the former. In this case, it is desired not to make the salts of dyes thus formed with such organic anions too highly hydrophobic or not to reduce the affinity between the salts of dyes with such organic acids and intercalated compounds, in order not to reduce the affinity of intercalated compounds for water-soluble cationic dyes.

Of water-soluble dyes for use in the present invention, water-soluble anionic dyes have a monoazo group, a disazo group, an anthraquinone skeleton, a triphenylmethane skeleton or the like as the chromophoric group and additionally have from 1 to 3 anionic water-soluble groups such as sulfonato groups or carboxylic groups in one molecule. As preferred examples of such water-soluble anionic dyes for use in the present invention, mentioned are C.I. Direct Yellows 1, 8, 11, 12, 24, 26, 27, 28, 33, 39, 44, 50, 58, 85, 86, 87, 88,89, 98, 100 and 110, for yellow direct dyes; C.I. Direct Reds 1, 2, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 321, for magenta direct dyes; C.I. Direct Blues 1, 2, 6, 8, 15, 22, 25, 41, 71, 76, 77, 78, 80, 86, 90, 98, 106, 108, 120, 158, 160, 163, 165, 168, 192, 193, 194, 195, 196, 199, 200, 201, 202, 203, 207, 225, 226, 236, 237, 246, 248 and 249, for cyan direct dyes; C.I. Direct Blacks 17, 19, 22, 32, 38, 51, 56, 62, 71, 74, 75, 77, 97, 105, 106, 107, 108, 112, 113, 117, 118, 132, 133 and 146, for black direct dyes; C.I. Acid Yellows 1, 3, 7, 11, 17, 19, 23, 25, 29, 36, 38, 40, 42, 44, 49, 59, 61, 70, 72, 75, 76, 78, 79, 98, 99, 110, 111, 112, 114, 116, 118, 119, 127, 128, 131, 135, 141, 142, 161, 162, 163, 164 and 165, for yellow acidic dyes; C.I. Acid Reds 1, 6, 8, 9, 13, 14, 18, 26, 27, 32, 35, 37, 42, 51, 57, 75, 77, 80, 82, 83, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 199, 209, 211, 215, 216, 217, 219, 249, 252, 254, 256, 257, 262, 265, 266, 274, 276, 282, 283, 303, 317, 318, 320, 321 and 322, for magenta acidic dyes; C.I. Acid Blues 1, 7, 9, 15, 22, 23, 25, 27, 29, 40, 41,. 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 175, 182, 183, 184, 187, 192, 199, 203, 204, 205, 229, 234 and 236 for cyan acidic dyes; C.I. Acid Blacks 1, 2, 7, 24, 26, 29, 31, 44, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159 and 191, for black acidic dyes.

These water-soluble anionic dyes may directly be incorporated into ink compositions as they are. If desired, however, a part of the counter cations of these dyes may be substituted by organic cations such as onium ions, so as to improve the compatibility of the dyes with alcohols which are in ink compositions as auxiliary components and to prevent the dyes from bleeding in the dye-receiving layer on the printing paper. In this case, it is desired not to make the salts of dyes thus formed with such organic cations too highly hydrophobic, in order not to reduce the affinity of intercalated compounds for water-soluble anionic dyes.

The ink composition of the present invention may contain, if desired, additives that have heretofore been incorporated into conventional aqueous ink compositions for ink jet recordings such as anti-fungal agents, etc., in addition to the above-mentioned water-soluble cationic dyes or water-soluble anionic dyes.

Where images are formed, using the printing paper of the present invention such as those shown in FIGS. 1 to 3 and the above-mentioned ink composition, for example, the ink composition may be jetted out through an ordinary ink jet recording device equipped with bubble-driving jet nozzles, piezo-driving jet nozzles or the like, selectively onto a dye-receiving layer on the printing paper of the present invention in accordance with the image signal applied to the device.

Where the composition for forming a dye-receiving layer of the present invention is desired to be sprayed or jetted out onto a base support through spraying nozzles or ink-jetting nozzles and dried to form a dye-receiving layer thereon to obtain a printing paper, an ink jet printer equipped with nozzles through which the composition for forming a dye-receiving layer is sprayed or jetted out onto the base support is employed. Using the ink jet printer, a dye-receiving layer may be formed on the base support simultaneously with forming an image on the layer, by ink jet recording. According to the image forming method characterized in that the dye-receiving layer is formed on the base support just before forming an image thereon by ink jet recording, particular commercial papers for exclusive use in ink jet recording are not needed but any ordinary printing materials such as household or officehold high-quality papers or OHP sheets may be used for forming color images thereon by ink jet recording. The image forming method is within the scope of the present invention.

Figure 4:
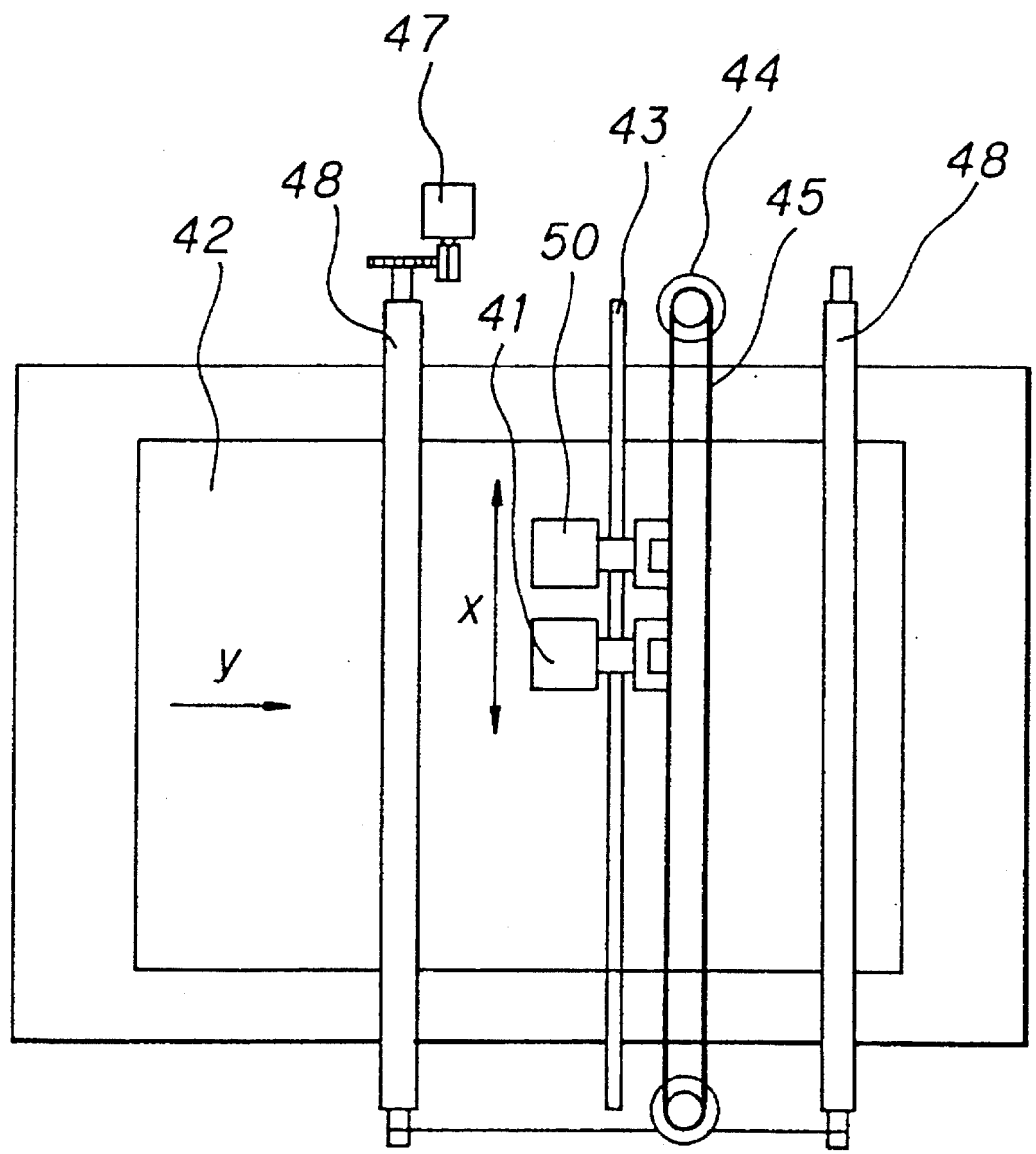
FIG. 4 is a systematic view showing a serial-type ink jet recording device employable in the present invention.
Figure 5:
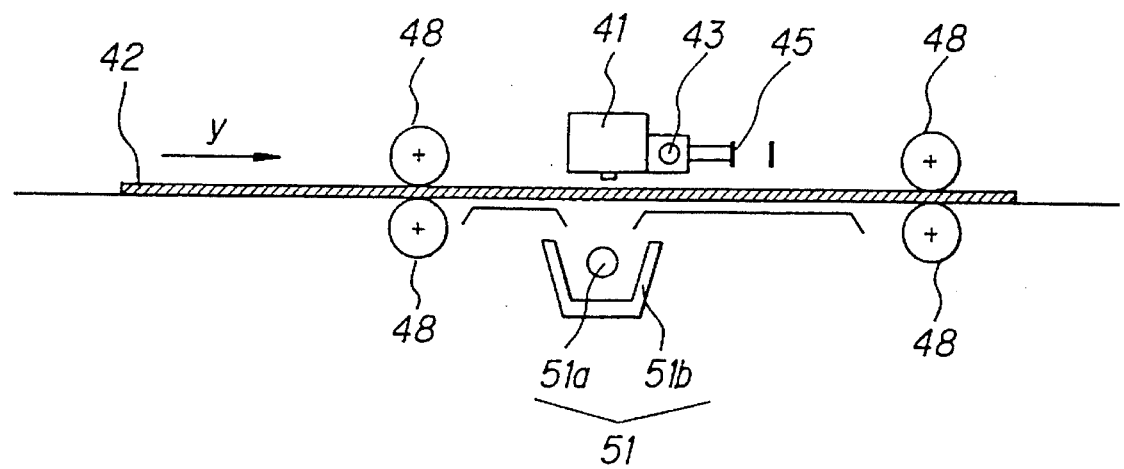
FIG. 5 is a cross-sectional view showing the area of heads in the recording device of FIG. 4.
Figure 6:
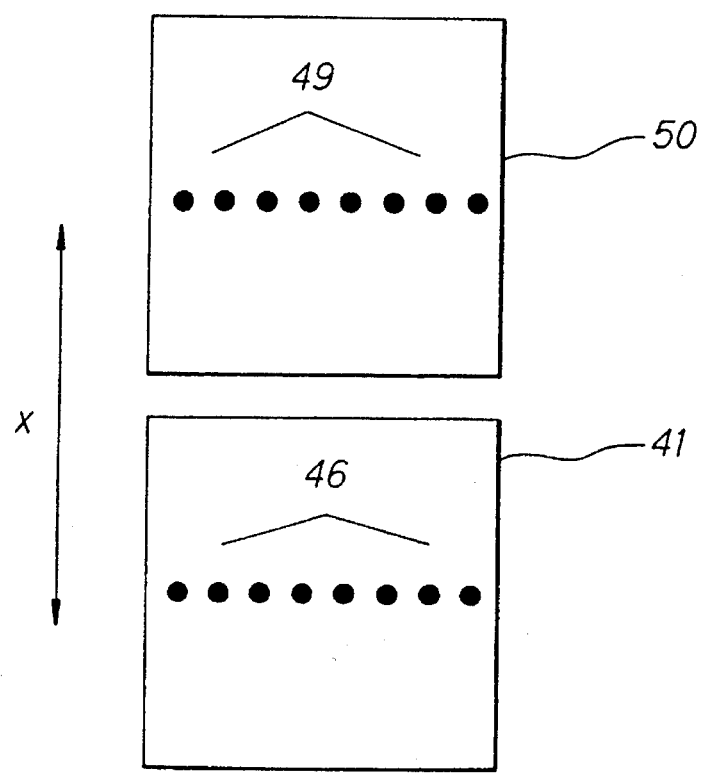
FIG. 6 is an explanatory view showing the arrangement of nozzles in the the recording device of FIG. 4.

One example of a printer to be used for the image forming method will be shown in FIG. 4. Precisely, FIG. 4 is a systematic view showing a so-called serial-type ink jet recording device, which is additionally equipped with a means for forming a dye-receiving layer. The means is provided with nozzles through which the composition for forming a dye-receiving layer of the present invention is jetted out onto a base support to form a dye-receiving layer thereon. FIG. 5 is an explanatory view showing the cross section of the part around the heads of the recording device of FIG. 4; and FIG. 6 is an explanatory view showing the arrangement of nozzles in the heads.

Using the serial-type ink jet recording device of this kind, printing is effected in such a way that the printing head 41 equipped with ink nozzles through which an ink is jetted out is scanned by reciprocating motion in the widthwise direction (arrowed by "x") of the recording medium 42 such as paper, plastic film, cloth, etc. while the recording medium 42 is conveyed in the direction arrowed by "y", as shown in FIG. 4 and FIG. 5.

In this embodiment, the printing head 41 is held by the shaft 43, while being scanned by the belt 45 wound around the head-feeding motor 44. As the printing head 41, for example, usable is such that it obtains an ink-jetting pressure by the deformation of a so-called piezodevice or such that it obtains the same by boiling an ink with a heating device. The printing head 41 has plural ink nozzles 46 arranged in the manner shown in FIG. 6. Though the printing head generally has plural ink nozzles such as those shown in this embodiment, but it may have only one ink nozzle.

The recording medium 42 is conveyed by the paper-feeding rollers 48 that are rotated by the paper-feeding motor 47.

The serial-type ink jet recording device of this embodiment is equipped with the jetting head 50 having the jet nozzles 49 for jetting out the composition for forming a dye-receiving layer, in the scanning direction of the printing head 41 (see FIG. 6). The jet nozzles 49 are disposed in the positions corresponding to the ink nozzles 46 for jetting out an ink therethrough, in such a way that each of the former corresponds to each of the latter by one to one.

On the side opposite to the jetting head 50, the printing head 41 and the recording medium 42, provided is the heater 51 composed of the lamp 51a and the reflective sheet 51b, as the means for drying the composition for forming a dye-receiving layer that has been jetted out from the jetting head 51 and the ink that has been jetted out from the printing head 41. However, the drying means of this type is not always necessary in this embodiment but may optionally be provided therein when the drying speed of the jetted composition for forming a dye-receiving layer or that of the jetted ink is low if not forcedly dried. Regarding the position of the drying means, if provided, the heater 51 is positioned just below the printing head 41 in FIG. 5, but this is not limited to the illustrated one.

The recording device having the illustrated structure (FIG. 4) may be preferably applied to the image forming method of the present invention, when the ink composition of the invention and the composition for forming a dye-receiving layer of the invention are combined and set in this.

Figure 7A:
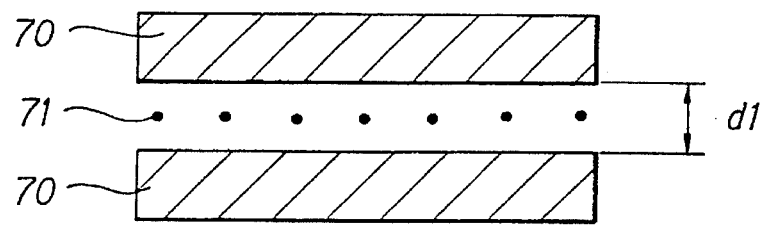
FIG. 7(a) to FIG. 7(c) show explanatory views explaining the theory of fixation of ink, according to the present invention. Precisely.

Referring to a synthetic saponite to be included in montmorillonoids, as one example of the intercalated compounds to be in the dye-receiving layer of the printing paper of the present invention which is suitable to ink jet recording with an aqueous ink composition, the compound has a layered structure composed of the repetition of three-layered structures having normal octahedrons as the base skeleton, in which the layers 70 hold interlayer water and sodium ions 70 therebetween (see FIG. 7(a)). In this, the interlayer distance is referred to as d1.

Figure 7B:
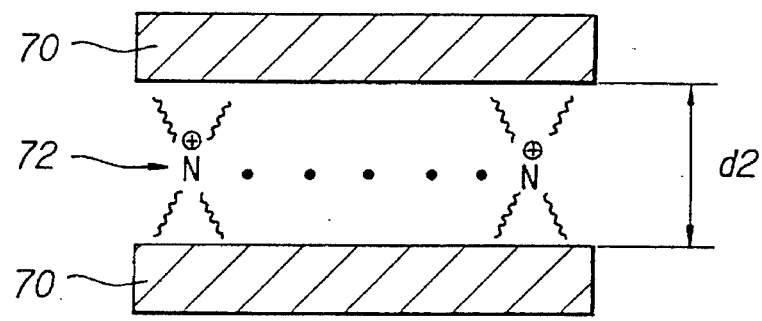

So as to improve the dispersibility of a binder resin in the intercalated compound and to improve the swellability of the compound with non-aqueous media such as alcohols, the synthetic saponite 70 is swollen with water and organic cations such as quaternary ammonium ions 72 are added thereto, as shown in FIG. 7(b). This results in ion-exchanging, by which quaternary ammonium ions 72 are captured between the layers in place of sodium ions 71. The interlayer distance d2 in this condition is larger than the interlayer distance d1 in the non-treated synthetic saponite.

Figure 7C:
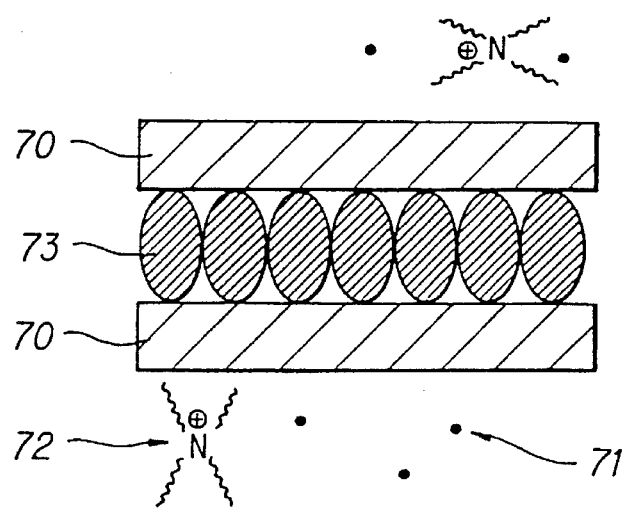

When the ink composition of the present invention is applied to the dye-receiving layer on the printing paper having therein the synthetic saponite shown in FIG. 7(a) or FIG. 7(b) or its sintered product, the water-soluble cationic dye molecules to be contained in the ink composition are rapidly transferred into the interlayers in the intercalated compound in the dye-receiving layer along with a solvent (e.g., a liquid having a high dielectric constant, such as water, alcohols), while causing ion-exchanging between the dye cations and the sodium ions 71 or the quaternary ammonium ions 72 existing in the interlayers whereby the water-soluble cationic dye molecules 73 are captured in the interlayers in the synthetic saponite 70, as shown in FIG. 7(c).

The water-soluble cationic dye molecules 73 that have been captured in the interlayers in the synthetic saponite 70 form ionic bonds to the synthetic saponite 70 and are thereby firmly fixed to the dye-receiving layer. Accordingly, using the printing paper and the ink composition of the present invention, color images with high fixation comparable to that of silver salt photographic images may be formed with high resolution. Where transparent intercalated compounds and binder resins are used in this case, color images with high saturation may be formed.

The following is another embodiment where a synthetic hydrotalcite of an anion-exchangeable intercalated compound is used in place of the synthetic saponite of a cation-exchangeable intercalated compound.

Figure 8A:
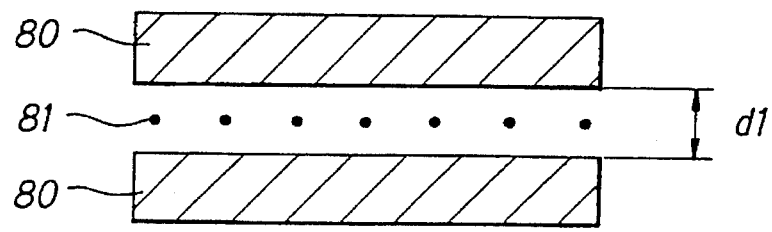
FIG. 8(a) to FIG. 8(c) show explanatory views explaining the theory of fixation of ink, according to the present invention. Precisely.

The illustrated hydrotalcite has exchangeable anions such as carbonato ions 81 in its interlayers and on the edges of the octahedrons constituting the layers 80. The interlayer distance in this condition is referred to as d1 (FIG. 8(a)).

Figure 8B:
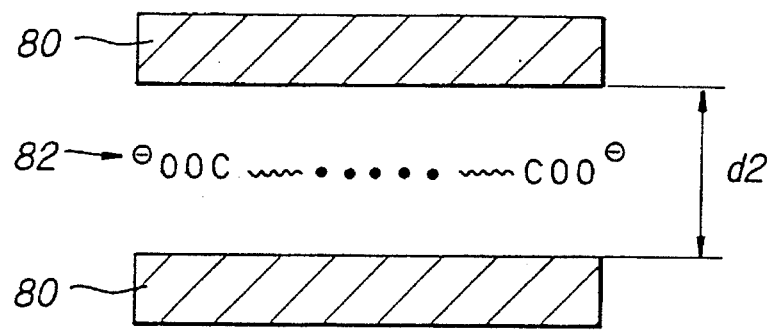

When the synthetic hydrotalcite 80 is swollen with water and organic anions such as higher fatty acid ions 82 are added thereto, then these cause ion-exchanging as shown in FIG. 8(b) with the result that these fatty acid ions 82 are captured in the interlayers in place of the carbonato ions 81 and function as interlayer pillars. Under this condition, the interlayer distance d2 is larger than the interlayer distance d1 in the non-treated synthetic hydrotalcite. However, the substitution by these organic anions must not be effected too excessively, in order not to kill all the fixing sites in the dye molecules or not to reduce the water-absorbing capacity of the dye to an impractical degree.

Since the thus ion-exchanged synthetic hydrotalcite holds the fatty acid ions 82 having hydrophobic chains in its interlayers, its swellability with non-aqueous media such as alcohols is increased higher than that of the non-treated one.

Figure 8C:
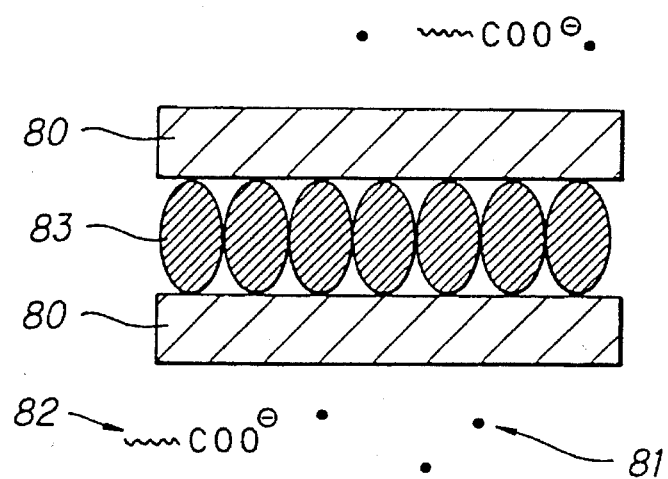

When ink drops containing direct dyes or acidic dyes are jetted out onto a printing paper having thereon a dye-receiving layer formed by coating a dispersion of the synthetic hydrotalcite having the interlayer distance of d1 or d2 or its sintered product dispersed in a thermoplastic resin, on a base support followed by drying it thereon, to form an image on the paper, the water-soluble anionic dyes (direct dyes or acidic dyes) contained in the ink composition are immediately transferred into the interlayers in the intercalated compound contained in the dye-receiving layer along with the solvent (liquid having a high dielectric constant such as water, alcohols) to cause ion-exchanging between the dye anions and the carbonato ions 81 or, as the case may be, the fatty acid ions 82 on the surfaces of the interlayers, by which the water-soluble anionic dye molecules 83 are captured in the interlayers in the synthetic hydrotalcite 80, as shown in FIG. 8(c).

The water-soluble anionic dye molecules 73 that have been captured in the interlayers in the synthetic hydrotalcite 80 form ionic bonds to the synthetic hydrotalcite 80 and are thereby firmly fixed to the dye-receiving layer. This phenomenon is not limited to occur only in the interlayers but may be expected to occur also in the other surfaces having the similar behaviors.

Accordingly, using the printing paper and the ink composition of the present invention, color images with high fixation comparable to that of silver salt photographic images may be formed with high resolution. Where transparent intercalated compounds and binder resins are used in this case, color images with high saturation may be formed.

According to the present invention, since the water-soluble dyes captured in the interlayers in the intercalated compounds are not directly exposed to any external light, the images formed may have extremely improved fastness to light.

The present invention will be explained in more detail with reference to the following examples, which, however, are not intended to restrict the scope of the present invention. In the following examples, "parts" are by weight.

EXAMPLE 1

Preparation of water-soluble cationic dye-containing aqueous ink compositions:

The components shown in Table 1 and Table 2 below were uniformly blended to prepare Group (I) and Group (II) of aqueous ink compositions of yellow, magenta, cyan and black colors for forming color images.

In preparing the aqueous ink compositions of Group (II), a part of the counter ions of each dye were substituted by organic anions (paratoluenesulfonato ions) so as to elevate the affinity of the dye for non-aqueous media to thereby increase the content of the non-aqueous medium in the composition.

TABLE 1

| Group (I) of Aqueous Ink Compositions | |
|---|---|
| Component | Amount |
| Dye<br>Yellow C.I. Basic Yellow 2<br>Magenta C.I. Basic Red 46 | 2 parts |

TABLE 1-continued

| Group (I) of Aqueous Ink Compositions | |
|---|---|
| Component | Amount |
| Cyan C.I. Basic Blue 3 | |
| Black C.I. Basic Black 2 | |
| Glycerin | 2 parts |
| Diethylene Glycol | 6 parts |
| Water | 30 parts |

TABLE 2

| Group (II) of Aqueous Ink Compositions | |
|---|---|
| Component | Amount |
| Dye | 2 parts |
| Yellow C.I. Basic Yellow 51 | |
| Magenta C.I. Basic Red 23 | |
| Cyan C.I. Basic Blue 75 | |
| Black C.I. Basic Black 2 | |
| Sodium Paratoluenesulfonate | 1 part |
| Diethylene Glycol | 20 parts |
| Polyethylene Glycol | 20 parts |
| Water | 50 parts |

EXAMPLE 2

Preparation of aqueous cationic dye-receiving printing papers:

150 g of synthetic hectorite (LAPONITE, trade name—made by Nippon Silica Industrial Co.) were put in one kg of ethanol solution containing 10 wt. % of polyvinyl butyral (BL-1, trade name—made by Sekisui Chemical Industry Co.) and dispersed with a roll mill for 2 days to obtain a suspension. The suspension was coated on one surface of a 100 μm-thick neutral paper, using a doctor blade, and dried with a hot air at 110° C. for one minute to form a solid film thereon.

Next, a 50 μm-thick polyethylene terephthalate film was covered over the solid film and heated under pressure for heat-welding, by passing them through rollers each having a surface temperature of 120° C. at a speed of one cm/sec. After cooled to room temperature, the uppermost polyethylene terephthalate film was peeled off to obtain a printing paper composed of the neutral paper and a transparent and glossy layer formed thereon.

The thus-prepared printing papers were set in a paper-feeding tray in an ink jet printer (Desk Jet 505J, trade name—made by Hewlett-Packard, Ltd.) and printed by ink jet recording, using the aqueous ink compositions of Group (I).

After printing, the printed papers were left as they were for about 5 minutes and then subjected to a water-proofness test (fixation test), in which their surfaces having images thereon were dipped in water for 24 hours to check as to whether or not the dye dissolved out into water. As a result, no dye dissolved out into water throughout the whole region of the printed image ranging from the low-density area to the high-density area. Thus, the water-proofness of the printed image was excellent.

COMPARATIVE EXAMPLE 1

Printing papers were prepared in the same manner as in Example 2, except that the synthetic hectorite was not used. These printing papers were printed by ink jet recording and then subjected to the water-proofness test, in the same manner as in Example 2. As a result, the dye in the printed images began to dissolve out into water immediately after the printed papers were dipped in water, and it almost completely dissolved out into water in several hours. In this comparative example, the printed images had no fixation.

EXAMPLES 3 TO 6

Preparation of water-soluble cationic dye-receiving printing papers:

100 cc of an aqueous suspension containing 3 g of beaten pulp (RESTIGOUCHE Bleached Pulp HITEE; csf 270 cc) were put in a beaker containing therein synthetic saponite (SUMECTON SA, trade name—made by Kunimine Industrial Co.) of the amount indicated in Table 3 below, and the same amount of water was added thereto. Then, while these were lightly stirred with a spoon, 0.06 g (12.0% as its solid content) of a sizing agent (MACOPELU 12, trade name—made by Dick Hercules Co.) to prevent the paper from shrinking in the presence of water and 0.12 g of a fixing agent (KAIMEN 557-7, trade name—made by Dick Hercules Co.) to accelerate pulp-to-pulp adhesion or pulp-to-pigment adhesion were added thereto. The resulting mixture was ground in a mixer for about 2 minutes, then put in a water tank in a paper-making machine, and the dispersion in the tank was stirred with a mesh-like stirrer.

Next, water was drawn out of the water tank all at a time, and a water-absorbing paper was put over the sheet-like substance deposited at the bottom of the water tank and pressed with a heavy stone roller. Next, the water-absorbing paper was removed, and the raw paper formed at the bottom of the tank was peeled off from the lowermost screen mesh and dewatered in a drier at 160° C. to

TABLE 3

| Amount of Synthetic Saponite Added | |
|---|---|
| Example No. | Amount Added (g) |
| 3 | 3 |
| 4 | 2 |
| 5 | 1.0 |
| 6 | 0.5 |

The thus-obtained printing papers were printed by ink jet recording in the same manner as in Example 2, using the aqueous ink compositions of Group (II) having a higher content of the non-aqueous medium than the aqueous ink compositions of Group (I). The penetration of the aqueous ink compositions into the printing papers was good.

Next, the thus-printed papers were subjected to a solvent resistance test (using ethanol), in which the papers were dipped in ethanol to check as to whether or not the dye dissolved out into ethanol. As a result, substantially no dye dissolved out from the printed papers of Examples 3 to 5 at every density of the printed images, and the printed images had excellent solvent resistance (fixation). In the printed papers of Example 6, the dye dissolved out only slightly from the high-density area in the formed images, which, however, causes no problem in practical use. From these results, it is noted that the the formed images, which, however, causes no problem in practical use. From these results, it is noted that the solvent resistance (alcohol resistance) of the printing papers of these examples was greatly improved due to the incorporation of the intercalated compound thereinto.

COMPARATIVE EXAMPLE 2

Printing papers were prepared in the same manner as in Examples 3 to 6, except that the synthetic saponite was not used. These printing papers were printed by ink jet recording and subjected to the solvent resistance test for the printed images, in the same manner as in Examples 3 to 6. As a result, the printed dye immediately dissolved out from all the image regions having various densities. Thus, the solvent resistance of the printing papers in this comparative example was not good.

EXAMPLE 7

Preparation of water-soluble cationic dye-receiving printing papers:

20 g of synthetic smectite (SWN, trade name—made by Corp Chemical Co.) were dispersed and swollen in one liter of water, and ethanol of the same amount was added to the dispersion. While stirring, 0.65 g (1 mg equivalent) of tetra-n-decylammonium bromide dissolved in 200 cc of ethanol were dropwise added to the dispersion. This was allowed to stand at room temperature for one day, whereupon granular aggregates precipitated. The precipitates were separated from the dispersion by filtration and washed with ethanol to remove the non-reacted quaternary ammonium salt therefrom. Subsequently, the thus-washed precipitates were dried at 70° C. to obtain a pure-white powder.

20 g of the powder were put in 120 g of ethanol solution containing 10 wt. % of hydroxypropyl cellulose and dispersed by roll-milling for 2 days to obtain a suspension. To the dispersion, added were 2 g of a tri-functional isocyanate (COLONATE HL, trade name—made by Nippon Polyurethane Co.) and one g of an ultraviolet absorbent (SEESORB 101S, trade name—made by SHIPRO Chemical Co.), and mixed. The resulting mixture was coated over a lubricant-treated, 6 μm-thick polyethylene terephthalate film on its lubricant-treated surface, using a wire bar, and dried with a hot air at 120° C. for 5 minutes to form a 5 μm-thick solid film thereon.

Next, an adhesive composition comprising 2 parts of vinylidene chloride-acrylonitrile copolymer (made by Aldorich Co.) and 20 parts of MEK was coated on a 100 μm-thick synthetic paper at a wet thickness of 50 μm and dried to prepare a base support for a printing paper.

On the adhesive-coated surface of the base support, putted was the previously-prepared solid film layer containing the synthetic smectite. Then, this was heated under pressure for heat-welding, by passing it through metal rollers heated at 120° C., at a speed of 3 cm/sec. After cooled to room temperature, the uppermost, lubricant-treated polyethylene terephthalate film was peeled off to obtain a glossy, pure-white printing paper having a dye-receiving layer thereon.

The thus-prepared printing papers were printed by ink jet recording in the same manner as in Example 2, using the aqueous ink compositions of Group (II). As a result, high-quality images composed of true-circular dots were obtained. The thus-printed papers were dipped in water for one full day. The printed surfaces of the thus-dipped papers were rubbed with fingers under light pressure, but no dye dissolved out. Thus, the fixation of the dye to the papers was verified to be good. In addition, the solid film containing the intercalated compound did not peel off from the base support.

The printed papers were exposed to a Xe light at 90,000 J/m$^2$ in the atmosphere at 30° C. and 65% RH. As a result, the percentage of the retention of the dye was 80% or more for each dye. From this, it is noted that the fastness of the printed images to light is comparable to that of silver salt photographs.

EXAMPLE 8

Preparation of water-soluble cationic dye-receiving printing paper for OHP:

A solution comprising 2 parts of a polyamide resin (VERSAMID 725, trade name—made by Henckel Hakusui Co.) and 20 parts of a mixed solvent of MEK/IPA (1/1, by weight) was coated on a 125 μm-thick, transparent polyethylene terephthalate film having a lubricant layer on its back surface, at a wet thickness of 100 μm, and then dried to obtain a transparent base support for OHP printing papers.

Next, a dye-receiving layer was formed on the base support in the same manner as in Example 7 to obtain a transparent, glossy printing paper for OHP.

The thus-prepared printing papers were printed by ink jet recording in the same manner as in Example 2, using the aqueous ink compositions of Group (I), and transparent, high-quality, natural color images were obtained.

The thus-printed papers were stored in the atmosphere at 60° C. and 90% RH for 2 weeks, whereupon no dot bled. The fixation of the printed images was excellent.

COMPARATIVE EXAMPLE 3

Printing papers for OHP were prepared in the same manner as in Example 8, except that the synthetic smectite was not used, and these were printed by ink jet recording. As a result, the density of the images formed herein was about ¼ to ½ of that of the images formed in Example 8 for each dye. In addition, the dots were obviously broadened and the images were blurred. The fixation of the printed images was not good.

EXAMPLE 9

Preparation of water-soluble anionic dye-containing aqueous ink compositions:

The components shown in Table 4, Table 5 and Table 6 below were uniformly blended to prepare Group (III) and Group (IV) of aqueous ink compositions of yellow, magenta and cyan colors for forming color images.

In preparing the aqueous ink compositions of Group (IV), a part of the counter ions of each dye were substituted by organic cations (tetramethylammonium ions) so as to elevate the affinity of the dye for non-aqueous media to thereby increase the content of the non-aqueous medium in the composition.

TABLE 4

| Group (III) of Aqueous Ink Compositions | |
|---|---|
| Component | Amount |
| Dye<br>Yellow C.I. Acid Yellow 23<br>Magenta C.I. Acid Red 52<br>Cyan C.I. Acid Blue 9 | 2 parts |
| Glycerin | 2 parts |
| Diethylene Glycol | 6 parts |
| Water | 30 parts |

TABLE 5

Group (IV) of Aqueous Ink Compositions

| Component | Amount |
| --- | --- |
| Dye | 2 parts |
| Yellow C.I. Acid Yellow 23 | |
| Magenta C.I. Acid Red 52 | |
| Cyan C.I. Acid Blue 9 | |
| Tetramethylammonium Chloride | 1 part |
| Diethylene Glycol | 20 parts |
| Polyethylene Glycol | 20 parts |
| Water | 50 parts |

TABLE 6

Group (V) of Aqueous Ink Compositions

| Component | Amount |
| --- | --- |
| Dye | 2 parts |
| Yellow C.I. Direct Yellow 87 | |
| Magenta C.I. Direct Red 227 | |
| Cyan C.I. Direct Blue 199 | |
| Tetramethylammonium Chloride | 1 part |
| Diethylene Glycol | 60 parts |
| Polyoxyethylene Nonionic Surfactant | 0.1 parts |
| Water | 30 parts |

EXAMPLE 10

Preparation of aqueous anionic dye-receiving printing papers:

150 g of synthetic hydrotalcite (DHT-4A, trade name—made by Kyowa Chemical Industry Co.) were put in one kg of ethanol solution containing 10 wt. % of polyvinyl butyral (BL-1, trade name—made by Sekisui Chemical Industry Co.) and dispersed with a roll mill for 2 days to obtain a suspension. The suspension was coated on one surface of a 100 μm-thick neutral paper, using a doctor blade, and dried with a hot air at 110° C. for one minute to form a solid film thereon.

Next, a 50 μm-thick polyethylene terephthalate film was covered over the solid film and heated under pressure for heat-welding, by passing them through rollers each having a surface temperature of 120° C. at a speed of one cm/sec. After cooled to room temperature, the uppermost polyethylene terephthalate film was peeled off to obtain a printing paper composed of the neutral paper and a transparent and glossy layer formed thereon.

The thus-prepared printing papers were set in a paper-feeding tray in an ink jet printer (Desk Jet 505J, trade name—made by Hewlett-Packard, Ltd.) and printed by ink jet recording, using the aqueous ink compositions of Group (III).

After printing, the printed papers were left as they were for about 5 minutes and then subjected to a water-proofness test (fixation test), in which their surfaces having images thereon were dipped in water for 24 hours to check as to whether or not the dye dissolved out into water. As a result, no dye dissolved out into water throughout the whole region of the printed image ranging from the low-density area to the high-density area. Thus, the water-proofness of the printed image was excellent.

COMPARATIVE EXAMPLE 4

Printing papers were prepared in the same manner as in Example 10, except that the synthetic hydrotalcite was not used. These printing papers were printed by ink jet recording and then subjected to the water-proofness test, in the same manner as in Example 10. As a result, the dye in the printed images began to dissolve out into water immediately after the printed papers were dipped in water, and it almost completely dissolved out into water in several hours. In this comparative example, the printed images had no fixation.

EXAMPLES 11 TO 14

Preparation of water-soluble anionic dye-receiving printing papers:

100 cc of an aqueous suspension containing 3 g of beaten pulp (RESTIGOUCHE Bleached Pulp HITEE; csf 270 cc) were put in a beaker containing therein synthetic hydrotalcite (DHT-4C, trade name—made by Kyowa Chemical Industry Co.) of the amount indicated in Table 7 below, and the same amount of water was added thereto. Then, while these were lightly stirred with a spoon, 0.06 g (12.0% as its solid content) of a sizing agent (MACOPELU 12, trade name—made by Dick Hercules Co.) to prevent the paper from shrinking in the presence of water and 0.12 g of a fixing agent (KAIMEN 557-7, trade name—made by Dick Hercules Co.) to accelerate pulp-to-pulp adhesion or pulp-to-pigment adhesion were added thereto. The resulting mixture was ground in a mixer for about 2 minutes, then put in a water tank in a paper-making machine, and the dispersion in the tank was stirred with a mesh-like stirrer.

Next, water was drawn out of the water tank all at a time, and a water-absorbing paper was put over the sheet-like substance deposited at the bottom of the water tank and pressed with a heavy stone roller. Next, the water-absorbing paper was removed, and the raw paper formed at the bottom of the tank was peeled off from the lowermost screen mesh and dewatered in a drier at 160° C. to obtain a printing paper composed of integrated dye-receiving layer and support.

TABLE 7

Amount of Synthetic Hydrotalcite Added

| Example No. | Amount Added (g) |
| --- | --- |
| 11 | 4.2 |
| 12 | 3.3 |
| 13 | 1.0 |
| 14 | 0.5 |

The thus-obtained printing papers were printed by ink jet recording in the same manner as in Example 10, using the aqueous ink compositions of Group (IV) having a higher content of the non-aqueous medium than the aqueous ink compositions of Group (III). The formed dots bled a little, being different from those formed in Example 10, but the bleeding of the dots does not cause any problem in practical use. The penetration of the aqueous ink compositions into the printing papers was good.

Next, the thus-printed papers were subjected to a solvent resistance test (using ethanol), in which the papers were dipped in ethanol to check as to whether or not the dye dissolved out into ethanol. As a result, substantially no dye dissolved out from the printed papers of Examples 11 to 13 at every density of the printed images, and the printed images had excellent solvent resistance (fixation). In the printed papers of Example 14, the dye dissolved out only slightly from the high-density area in the formed images, which, however, causes no problem in practical use. From these results, it is noted that the solvent resistance (alcohol resistance) of the printing papers of these examples was greatly improved due to the incorporation of the intercalated compound thereinto.

COMPARATIVE EXAMPLE 5

Printing papers were prepared in the same manner as in Examples 11 to 14, except that the synthetic hydrotalcite was not used. These printing papers were printed by ink jet recording and subjected to the solvent resistance test for the printed images, in the same manner as in Examples 11 to 14. As a result, the printed dye immediately dissolved out from all the image regions having various densities. Thus, the solvent resistance of the printing papers in this comparative example was not good.

EXAMPLE 14

Preparation of water-soluble anionic dye-receiving printing papers:

20 g of synthetic hydrotalcite (DHT-4C, trade name —made by Kyowa Chemical Industry Co.) were dispersed and swollen in one liter of water, and ethanol of the same amount was added to the dispersion. While stirring, sodium decanoate (2 mg equivalents) dissolved in 200 cc of ethanol was dropwise added to the dispersion. This was allowed to stand at room temperature for one day, whereupon granular aggregates precipitated. The precipitates were separated from the dispersion by filtration and washed with ethanol to remove the non-reacted fatty acid salt therefrom. Subsequently, the thus-washed precipitates were dried at 70° C. to obtain a pure-white powder.

20 g of the powder were put in 120 g of ethanol solution containing 10 wt. % of hydroxypropyl cellulose and dispersed by roll-milling for 2 days to obtain a suspension. To the dispersion, added were 2 g of a tri-functional isocyanate (COLONATE HL, trade name—made by Nippon Polyurethane Co.) and one g of an ultraviolet absorbent (SEESORB 101S, trade name—made by SHIPRO Chemical Co.), and mixed. The resulting mixture was coated over a lubricant-treated, 6 μm-thick polyethylene terephthalate film on its lubricant-treated surface, using a wire bar, and dried with a hot air at 120° C. for 5 minutes to form a 5 μm-thick solid film thereon.

Next, an adhesive composition comprising 2 parts of vinylidene chloride-acrylonitrile copolymer (made by Aldorich Co.) and 20 parts of MEK was coated on a 100 μm-thick synthetic paper at a wet thickness of 50 μm and dried to prepare a base support for a printing paper.

On the adhesive-coated surface of the base support, putted was the previously-prepared solid film layer containing the synthetic hydrotalcite. Then, this was heated under pressure for heat-welding, by passing it through metal rollers heated at 120° C., at a speed of 3 cm/sec. After cooled to room temperature, the uppermost, lubricant-treated polyethylene terephthalate film was peeled off to obtain a glossy, pure-white printing paper having a dye-receiving layer thereon.

The thus-prepared printing papers were printed by ink jet recording in the same manner as in Examples 11 to 14, using the aqueous ink compositions of Group (IV). As a result, high-quality images composed of true-circular dots were obtained.

The thus-printed papers were dipped in water for one full day. The printed surfaces of the thus-dipped papers were rubbed with fingers under light pressure, but no dye dissolved out. Thus, the fixation of the dye to the papers was verified to be good. In addition, the solid film containing the intercalated compound did not peel off from the base support.

EXAMPLE 16

Preparation of water-soluble anionic dye-receiving printing paper for OHP:

A solution comprising 2 parts of a polyamide resin (VERSAMID 725, trade name—made by Henckel Hakusui Co.) and 20 parts of a mixed solvent of MEK/IPA (1/1, by weight) was coated on a 125 μm-thick, transparent polyethylene terephthalate film having a lubricant layer on its back surface, at a wet thickness of 100 μm, and then dried to obtain a transparent base support for OHP printing papers.

Next, a dye-receiving layer was formed on the base support in the same manner as in Example 15 to obtain a transparent, glossy printing paper for OHP.

The thus-prepared printing papers were printed by ink jet recording in the same manner as in Example 11 to 14, using the aqueous ink compositions of Group (III), and transparent, high-quality, natural color images were obtained.

The thus-printed papers were stored in the atmosphere at 60° C. and 90% RH for 2 weeks, whereupon no dot bled. The fixation of the printed images was excellent.

COMPARATIVE EXAMPLE 6

Printing papers for OHP were prepared in the same manner as in Example 16, except that the synthetic hydrotalcite was not used, and these were printed by ink jet recording. As a result, the density of the images formed herein was about ¼ to ½ of that of the images formed in Example 16 for each dye. In addition, the dots were obviously broadened and the images were blurred. The fixation of the printed images was not good.

EXAMPLE 17

This example is to demonstrate the preparation of water-soluble cationic dye-receiving printing papers, in which a composition for forming a water-soluble cationic dye-receiving layer was jetted out onto commercial regenerated papers through ink jet nozzles and dried thereon.

First, 150 g of synthetic hectorite (LAPONITE, trade name—made by Nippon Silica Industrial Co.) were put in one kg of isopropanol solution containing 1 wt. % of polyvinyl butyral (BL-1, trade name—made by Sekisui Chemical Industry Co.) and 1 wt. % of propylene glycol and dispersed with a roll mill for 2 days to obtain a suspension containing particles of the synthetic hectorite having a particle size of 1 μm or less.

The suspension was substituted for the content in the cartridge for an ink jet printer (Desk Jet HP51626A, trade name—made by Hewlett-Packard Ltd.), and the cartridge was set in an ink jet printer (505J, trade name—made by Hewlett-Packard Ltd.). Using this, A4-size, commercial regenerated papers were solidwise printed and dried to obtain printing papers having an increased whiteness.

The thus-prepared printing papers were set in a paper-feeding tray in an ink jet printer (Desk Jet 505J, trade name—made by Hewlett-Packard, Ltd.), while one of the water-soluble ink compositions of Group (I) was substituted for the content in the cartridge for the ink jet printer (Desk Jet HP51626A, trade name—made by Hewlett-Packard Ltd.), and these were printed by ink jet recording using the substituted cartridge. Of the water-soluble ink compositions of Group (I), the black ink composition was not used.

After printing, the printed papers were left as they were for about 5 minutes and then subjected to a water-proofness test (fixation test), in which their surfaces having images thereon were dipped in distilled water for one full day to check as to whether or not the dye dissolved out into water. As a result, no dye dissolved out into water throughout the whole region of the printed image ranging from the low-density area to the high-density area. Thus, the water-proofness of the printed image was excellent.

COMPARATIVE EXAMPLE 7

Printing papers were prepared in the same manner as in Example 17, except that the synthetic hectorite was not used. These printing papers were printed by ink jet recording and then subjected to the water-proofness test, in the same manner as in Example 17. As a result, the dye in the printed images began to dissolve out into water immediately after the printed papers were dipped in water, and it almost completely dissolved out into water in several ten minutes. In this comparative example, the printed images had no fixation.

EXAMPLE 18

Preparation of water-soluble cationic dye-receiving printing papers:

This example is to demonstrate the preparation of water-soluble cationic dye-receiving printing papers, in which a composition for forming a water-soluble cationic dye-receiving layer was jetted out onto commercial regenerated papers through jetting nozzles and dried thereon.

First, 20 g of synthetic smectite (SWN, trade name—made by Corp Chemical Co.) were dispersed and swollen in one liter of water, and ethanol of the same amount was added to the dispersion. While stirring, 0.22 g (0.33 mg equivalents) of tetra-n-decylammonium bromide dissolved in 200 cc of ethanol were dropwise added to the dispersion. This was allowed to stand at room temperature for one day, whereupon granular aggregates precipitated. The precipitates were separated from the dispersion by filtration and washed with ethanol to remove the non-reacted quaternary ammonium salt therefrom. Subsequently, the thus-washed precipitates were dried at 70° C. to obtain a pure-white powder.

12 g of the powder were put in 120 g of ethanol/toluene mixture containing 1 wt. % of polyamide and dispersed by sand-milling until the dispersed smectite particles might have a particle size in the order of sub-microns. In this way, a suspension was obtained. To the dispersion, added were 3 g of ethylene carbonate and 0.03 g of an ultraviolet absorbent (SEESORB 101S, trade name—made by SHIPRO Chemical Co.), and mixed. The resulting mixture was filled in the jetting head 50 in a serial-type ink jet recording device such as that shown in FIG. 4, while one of the aqueous ink compositions of Group (II) was filled in the printing head 41 in the same. Using the device, 115 μm-thick PET films for OHP were printed to obtain full-color prints thereon. As a result, high-quality images composed of true-circular dots were obtained. The transparency of the printed films were sufficient for practical use.

A commercial antistatic spray consisting essentially of ethanol was excessively sprayed over the thus-printed films, but the printed images did not bleed and their fixation was excellent.

COMPARATIVE EXAMPLE 8

Color images were obtained in the same manner as in Example 18, except that the synthetic smectite was not used. As a result, since the penetrability of the ink was poor, the dots forming the pale color areas in the images had irregular shapes. In addition, a part of the ink was not absorbed by the dye-receiving layer but remained thereon in the deep color areas in the images with the result that the images became blurred when their surfaces were rubbed with fingers.

When a commercial anti-static spray consisting essentially of ethanol was sprayed over the printed films were, then the images also became blurred.

EXAMPLE 19

This example is to demonstrate the preparation of water-soluble anionic dye-receiving postcards, in which a composition for forming a water-soluble anionic dye-receiving layer was sprayed over commercial regenerated papers using a commercial air brush and dried thereon.

150 g of synthetic hydrotalcite (DHT-4A, trade name—made by Kyowa Chemical Industry Co.) and 300 g of polypropylene glycol were put in one kg of ethanol solution containing 1.5 wt. % of polyvinyl butyral (BL-S, trade name—made by Sekisui Chemical Industry Co.) and dispersed by roll-milling for 2 weeks until the dispersed hydrotalcite particles might have a particle size in the order of sub-microns. Thus, a suspension of the synthetic hydrotalcite was obtained.

The thus-obtained suspension was filled in the solution tank of a commercial air brush and sprayed over the entire back surfaces of postcards having excellent dot-reproducibility in an amount of 5 cc/postcard. After left as they were for one minute at room temperature, water-soluble anionic dye-receiving postcards were obtained.

The thus-obtained dye-receiving postcards were printed on their dye-receiving surfaces by ink jet recording, using an ink jet printer (1200C, trade name—made by Hewlett-Packard, Ltd.), and sharp images with excellent dot-reproducibility were obtained.

The thus-printed postcards were stored in the atmosphere at 60° C. and 90% RH for 2 weeks, whereupon no dots bled though the images somewhat faded.

COMPARATIVE EXAMPLE 9

Color images were obtained by the same ink jet recording as in Example 19, except that the synthetic smectite was not used. The printed postcards were stored in the atmosphere at 60° C. and 90% RH for 2 weeks, whereupon the images became blurred and faded.

EXAMPLE 20

This example is to demonstrate the preparation of water-soluble anionic dye-receiving printing papers, in which a composition for forming a water-soluble anionic dye-receiving layer was jetted out onto commercial regenerated papers through jetting nozzles and dried thereon.

20 g of synthetic hydrotalcite (DHT-4C, trade name—made by Kyowa Chemical Industry Co.) were dispersed and swollen in one liter of water, and ethanol of the same amount was added to the dispersion. While stirring, sodium decanoate (2 mg equivalents) dissolved in 200 cc of ethanol was dropwise added to the dispersion. This was allowed to stand at room temperature for one day, whereupon granular aggregates precipitated. The precipitates were separated from the dispersion by filtration and washed with ethanol to remove the non-reacted fatty acid salt therefrom. Subsequently, the thus-washed precipitates were dried at 70° C. to obtain a pure-white powder of decanoate-treated hydrotalcite.

Next, 2 parts of the decanoate-treated hydrotalcite powder, 1 part of hydroxypropyl cellulose, 4 parts of vinyl pyrrolidone-vinyl acetate copolymer, 1 part of titanium oxide, 1 part of polyethylene glycol and 18 parts of ethanol were dispersed by roll-milling for 3 weeks to obtain a suspension containing decanoate-treated hydrotalcite particles having a mean particle size of 0.3 μm.

The thus-obtained suspension was filled in the jetting head of a serial-type ink jet recording device of the same type as that employed in Example 18, while one of the aqueous ink compositions of Group (V) was filled in its printing head. First, the suspension was jetted out onto the label surfaces (on which sound signals are not recorded) of compact discs (CDs) through the jetting head while imagewise scanning them to thereby form a white dye-receiving layer thereon, and immediately after the formation, an image was printed on the layer in accordance with a video image signal.

The thus-printed CDs were left as they were for several minutes, and then a commercial lacquer spray containing a large amount of an organic solvent was sprayed over the entire image formed so as to make the image glossy and resistant to abrasion, whereupon the image was neither blurred nor bled.

COMPARATIVE EXAMPLE 10

Color images were obtained by the same ink jet recording as in Example 20, except that the synthetic hydrotalcite was not used. The same lacquer spray as that used in Example 20 was sprayed over the thus-printed CDs, whereupon the image was blurred and bled.

According to the present invention, images comparable to those by silver salt photography may be formed with excellent fixation and high resolution by ink jet recording. In particular, when transparent intercalated compounds and binder resins are used in the present invention, images with high saturation may be obtained.

While the invention has been described in detail and with reference to specific embodiments thereof, it will be apparent to one skilled in the art that various changes and modifications can be made therein without departing from the spirit and scope thereof.

What is claimed is:

1. A printing sheet for use in an ink jet printer comprising:
   a base support having a dye-receiving layer thereon, said dye-receiving layer comprising a resin binder and a dispersed, previously ion exchanged organic ion-substituted intercalated compound.

2. A printing sheet as defined in claim 1, wherein said previously ion-exchanged organic ion-substituted intercalated compound is selected from previously ion exchanged organic ion-substituted montmorillonoids and previously ion-exchanged organic ion-substituted hydrotalcites.

3. A printing sheet as defined in claim 1, wherein said previously ion-exchanged organic ion substituted intercalated compound is an organic quaternary ammonium-substituted montmorillonoid.

4. A printing sheet as defined in claim 1, wherein said previously ion-exchanged organic ion substituted intercalated compound is a fatty acid substituted hydrotalcite compound.

5. A printing sheet as defined in claim 1, wherein said previously ion-exchanged organic ion substituted intercalated compound is substituted with organic ions selected from tetraorgano quaternary ammonium ions and tetraorganophosphonium ions.

6. A printing sheet as defined in claim 1, wherein said previously ion-exchanged organic ion substituted intercalated compound is a montmorillonoid substituted with tetraalkyl quaternary ammonium ions wherein at least three of the four alkyl substituents are alkyl groups having at least four carbon atoms.

7. A printing sheet as defined in claim 1, wherein said previously ion-exchanged organic ion substituted intercalated compound is a hydrotalcite substituted with $C_5$–$C_{20}$ fatty acid ions.

8. A printing sheet as defined in claim 1, wherein said dye-receiving layer comprises from about 10 to about 90% by weight based on solids of said intercalated compound.

9. A printing sheet as defined in claim 1, wherein said resin binder is hydrophilic.

10. A printing sheet as defined in claim 1, wherein said resin binder is selected from the group consisting of: polyvinyl butyral resins, hydroxypropyl cellulose resins, vinyl pyrrolidone-vinyl acetate copolymer resins, polyvinyl alcohol resins and polyvinyl acetal resins.

11. A printing sheet as defined in claim 1, wherein said base support is selected from the group consisting of paper, synthetic paper, plastic and metal.

* * * * *